United States Patent

[11] 3,596,089

| [72] | Inventor | Roger L. Borst |
| | | Bartlesville, Okla. |
| [21] | Appl. No. | 3,493 |
| [22] | Filed | Jan. 16, 1970 |
| [45] | Patented | July 27, 1971 |
| [73] | Assignee | Phillips Petroleum Company |

[54] PALEOENVIRONMENTAL DETERMINATION BASED ON MINERAL AUTHIGENESIS
5 Claims, No Drawings

[52] U.S. Cl. ........................................................ 250/49.5 A,
23/230 EP, 250/51.5, 250/83 SA
[51] Int. Cl. ........................................................ H01j 37/26,
G01n 23/20, H01j 39/00
[50] Field of Search ........................................... 23/230 EP;
250/49.5 A, 71 G, 83 SA, 51.5, 83.6 S; 175/41, 50

[56] References Cited
UNITED STATES PATENTS

| 3,031,571 | 4/1962 | Fearon ........................ | 250/83 SA |
| 3,343,917 | 9/1967 | Friedman .................... | 23/230 EP |

*Primary Examiner*—James W. Lawrence
*Assistant Examiner*—A. L. Birch
*Attorney*—Young and Quigg

ABSTRACT: Subterranean sandy and silty sedimentary formations are examined to determine that mineral crystals, known to grow most favorably in alkaline, saline conditions that typify a marine depositional environment, are authigenic, i.e. formed in place, in the sedimentary formation. This indication of the nature of the depositional environment is useful for further exploration by geologists in seeking the presence of petroleum deposits.

PALEOENVIRONMENTAL DETERMINATION BASED ON MINERAL AUTHIGENESIS

BACKGROUND OF THE INVENTION

This invention relates to determining paleoenvironmental information for use in geochemical prospecting, particularly in geochemical prospecting for valuable deposits of oil and gas. In another aspect this invention relates to the determination of the marine or nonmarine nature of the depositional environment of mineral deposits in sedimentary formations. In still another aspect this invention relates to the determination of mineral authigenesis in subterranean sedimentary formations. In yet another aspect this invention relates to the determination of the hydrodynamic regime determining paths of fluid migration within a sedimentary formation at the time of authigenic crystal formation.

Various geochemical prospecting methods have heretofore been proposed for obtaining information indicative of the presence of mineral deposits. Generally speaking, these methods have employed the determination of various hydrocarbon constituents: bacteria, isotopes, trace elements, etc., to indicate the presence of subterranean deposits, such as oil and gas. However, the usefulness of such methods is generally limited to special situations and the accuracy of determination is affected by chemical changes occuring after the deposition.

It is generally believed that oil and gas are more often associated with marine or salt-water sediments than with nonmarine or fresh-water sediments. It is difficult to differentiate between marine and nonmarine deposits in subterranean sandstone or siltstone formations. Accordingly, a convenient method of classifying samples of sedimentary formations as to whether they are of marine or nonmarine origin is of distinct value in evaluating the likelihood of occurrence of petroleum deposits. It is of further value to be able to identify the marine or nonmarine depositional environment of samples as soon as possible in exploration to determine the likely profitability of further petroleum exploration.

The instant invention is useful not only in determining the possibilities of oil sources at a given drilling site before reservoirs are discovered, but also has expanded application in determining the extent of an existing reservoir, determining an ancient shoreline, or in indicating the hydrodynamic regime of a subterranean area during the period of oil emplacement. The usefulness of this invention extends from the first sampling undertaken during drilling in an exploratory area to the establishment of the paleogeographic configuration of the basin.

A primary object of this invention is to provide a method of determining paleoenvironmental information to be used in exploration for valuable deposits of gas and oil. Another object of this invention is to provide a method of determining the marine or nonmarine depositional environment of minerals in sandstone and siltstone formation that can be easily and rapidly accomplished. Still another object of this invention is to provide a method by which the paleogeographical configuration of an oil-producing basin can be delineated. Other objects of the invention will become apparent from a reading of the following description of the invention.

SUMMARY OF THE INVENTION

The present invention is based on the determination of the authigenic formation, i.e., the formation in place, in sedimentary sandstone or siltstone of mineral crystals the growth of which is known to be favored by an alkaline, saline environment. The formation of these crystals indicates that the pore water of the sandstone or siltstone, which controlled the type of mineral crystal formed, was of a marine depositional environment and therefore the occurrence of petroleum deposits is likely.

DETAILED DESCRIPTION

The authigenesis of the mineral deposit is determined by analysis of core or fragmental samples from various levels in sandstone and siltstone formations. The clay fraction of each sample is segregated by sedimentation. This fraction is subjected to standard X-ray diffraction procedures for identification of mineral components. Either a powder camera or diffractometer can be used to identify the mineral components. The identification of the minerals by X-ray diffraction facilitates and corroborates the identification of the minerals by observation of the crystals with the scanning electron microscope (SEM). Stereoscopic pairs of photographs of the mineral crystal samples are prepared from pictures made at a 6° angle from scans made by the scanning electron microscope. In these photographs the crystal shape of the deposited minerals is examined to determine whether the crystals are authigenic or detrital, i.e., have been washed into the interstices of the rock formation. Authigenic crystals show conformation to the idiomorphic form for the crystal, i.e., they are perfectly developed, whereas detrital crystals have worn edges and other imperfections caused by the attrition of being hydrodynamically moved from the place in which they were formed to the interstices of the rock formation from which the samples were taken. Stereoscopic photographs also permit a better three-dimensional determination of the intergrowth relationships of the authigenic crystals. Such intergrowths are another criterion of authigenesis since they are too delicate to survive transportation and deposition. By these techniques establishment that mineral crystals, the growth of which is favored by alkaline, saline conditions, are authigenic in the sedimentary rock indicates that the sediments containing the crystals accumulated in a marine depositional environment and therefore a petroleum-producing environment is favored.

The data collected from samples cored, broken, or torn from the penetrated rock in several different drillings within a given area can be compared by plotting the location and depth of samples which have been determined to contain authigenic crystals. These crystals grew in rock pores coincident with the formation or migration of petroleum. This graphic compilation of data can indicate in a three-dimensional representation the hydrodynamic regime that existed during the period of oil implacement of the subterranean area explored and can be used to delineate the boundaries of an oil-producing basin.

Experience shows that although authigenic minerals usually occur as clay-size crystals, a few microns' equivalent spherical diameter, they can range to silt-size, 2–62 microns in equivalent spherical diameter. These crystals can usually be identified by crystalline shape alone. The SEM examination is often all that is necessary both to identify the crystals and to establish the authigensis of the crystals in the sample rock. Since sample preparation and SEM examination are easy and rapid, this technique is favored for the determination of mineral authigenesis.

It has been found that since the fraction of authigenic minerals present in the clay-sized particles of a rock may constitute only a few percent of the total, the use of X-ray diffraction to determine the type of authigenic mineral that may be present in the rock will aid in the identification of these minerals on subsequent viewing with the SEM. Although the X-ray diffraction technique will record the presence of both detrital and authigenic minerals, in a sample from a suite of rocks characteristically low or deficient in a given mineral, intense sharp X-ray peaks for this specific mineral are strong evidence of authigenic crystals. The authigenic mineral grains are better crystallized than the detrital grains and give sharper, relatively stronger peaks.

This invention can be used in determining the environment of deposition of minerals in any sandstone or siltstone and those shales and mudrocks that are silty. The conditions for application of this invention are that the rock formation be sedimentary, somewhat permeable at the time of mineral authigenesis, and unmetamorphosed.

The presence of any crystalline mineral the growth of which is known to be favored by an alkaline, saline environment and which is found authigenic in the said sedimentary rocks can be taken to indicate a marine depositional environment. Among these crystalline minerals are albite, sodium monomorillonite, calcium-magnesium monomorillonite, chamosite, chlorite, glauconite, mixed-layer clays, analcite, calcite, and the like.

Samples of core or cuttings are taken in the manner well known in the art and prepared for X-ray diffraction by first segregating the clay fraction by standard sedimentation techniques.

Mineral identification of the clay fraction is accomplished by sedimenting small aliquots on a glass slide or porous ceramic tile and using the diffractometer to analyze the sample. The following instrumental settings are employed: crystal-monochromatized copper radiation generated at 35 kilovolts and 20 milliamperes; 1° line source and receiving slit assemblies; 1°per minute scanning rate; proportional counter with pulse-height analyzer. Four X-ray diffraction patterns are obtained for each sample; untreated at room temperature, after glycolation with ethylene glycol at room termpature, after heating the glycolated sample at 350° C. for one hour, and after heating the glycolated sample at 550° C. for one hour. Peak positions and relative intensities are matched to ASTM standard patterns for mineral identification. Shifts in peak positions as a consequence of sample treatment permits the identification of specific clay minerals.

An alternative technique of mineral identification by X-ray diffraction that is employed is that of using a powder camera, either 114.6 mm. or 57.3 mm. in diameter. Only microgram samples are required for the camera, hence minute amounts of precisely located samples can be identified. The sample to be X-rayed is first located in a hard sample or thin section using either a binocular or petrographic microscope, respectively. The sample is loosened with a sharp, delicate probe and mounted on a sample holder. The sample is irradiated with nickel-filtered copper radiation at 40 kilovolts and 20 milliamperes. Line positions on the developed film are measured with a calibrated scale and line intensities estimated visually. Comparison of these X-ray data with data of ASTM cards permit mineral identification.

To prepare for SEM examination fresh, fractured surfaces are exposed by breaking small chips from core samples or cuttings. These chips are mounted, coated with an electrically conductive film, and the sample is energized to produce a photographic image by secondary electron action. Stereoscopic pairs, using an angle of 6° between the photographs, are made for three-dimensional study of the crystal shape and perfection of edge formation of the crystals. Stereoscopic pairs permit a more precise determination of the two basic criteria of mineral authigenesis; perfection of crystal shape and the presence of mineral intergrowths.

A correlation of data between X-ray diffraction the SEM examination positively identifies the crystalline minerals. The SEM data established whether the crystals are authigenic in the sedimentary formations.

The following examples will illustrate the use of this invention.

EXAMPLE I

Marine Depositional Environment

Samples were prepared for SEM examination by breaking small chips from core samples to expose fresh fracture surfaces. The chips, about 2 mm. by 2 mm. by 5 mm., were attached to ½-inch diameter aluminum stubs with Duco cement, and coated with a thin electrically conductive film of gold-palladium alloy. For examination with the SEM, the samples were energized by an electron beam at an accelerating voltage of 20 kilovolts and an image of the specimen surface was produced by secondary electrons. Photographs were made at magnifications of 10,000X or less and were recorded with a 40-second scan. Magnifications of 20,000X or more were made using a 40- or 100-second scan. Stereoscopic pairs were made using an angle of 6° between the photographs. Two authigenic minerals albite ($NaAlSi_3O_8$) and the clay mineral, sodium montmorillonite were identified. The growth of these minerals is known to be favored by an alkaline, saline environment. It is inferred from this that the composition of pore water of the sand, which controls the type of authigenic minerals formed, reflects a marine depositional environment. This interpretation is supported by published faunal and sedimentological studies of the Repetto Formation from which the samples were taken which shown the formation to be a turbidite deposit.

EXAMPLE II

Nonmarine Depositional Environment

SEM analysis was made exactly as in the previous example. The clay fraction of each sample was segregated by standard sedimentation techniques, mounted with a preferred orientation on glass slides, and identified by X-ray diffraction using the diffractometer. Four X-ray diffraction patterns were obtained for each slide: untreated at room temperature, after glycolation with ethylene glycol at room temperature, after heating the glycolated sample at 350° C. for one hour, and after heating the glycolated sample at 550° C. for 1 hour. Microgram quantities of intergranular areas of a core chip, thought to be constituted of authigenic minerals, were mounted in a 57.3 mm. diameter powder camera, exposed to nickel-filtered copper radiation for 1 hour, the X-ray film developed, and the lines of the film used to identify the minerals in the intergranular areas. These precisely located and identified materials were then examined with the SEM and verified as consisting of authigenic minerals. The authigenic minerals identified were quartz ($SiO_2$) and clay minerals, kaolinite and dickite [$Al_4Si_4O_{10}(OH)_8$]. The growth of these minerals is favored by an acid environment lacking metal ions such as: $Na+$, $Ca++$, $Mg++$, etc. The inference is that the composition of the pore water of the sand, which controlled the type of authigenic minerals formed, reflects a nonmarine depositional environment. This interpretation is supported by published geologic reports which establish the depositional environment of the Muddy Sandstone, from which these samples were taken, as being primarily a continental, nonmarine environment.

I claim:

1. A method for determining paleoenvironmental information for sandy and silty sedimentary geological formations for use in prospecting for subterranean petroleum deposits comprising (1) collecting core or fragmental rock samples from the paleogeographical area to be explored, (2) determining the presence in the samples of crystals of minerals known to be formed most favorably in pore waters derived from a marine depositional environment, and (3) determining the degree of conformation of the crystals found to the idiomorphic form for that crystal whereby conformation to idiomorphic form indicates authigenesis of the crystal in the said geological formation.

2. Method of claim 1 wherein the said authigenic origin of the said mineral crystals is determined using the scanning electron microscope to establish intergrowth relationships of said crystals which could only result from mineral authigenesis.

3. Method of claim 1 wherein the identity of the crystalline minerals present in the sample is established by use of either an X-ray diffractometer or powder camera.

4. Method of claim 1 wherein the sample data from a paleogeographical area is further correlated to determine the hydrodynamic regime for the said area at the time of mineral deposition.

5. Method of claim 4 wherein the sample data are further correlated to determine the configuration of the depositional basin from which the samples were taken.